UNITED STATES PATENT OFFICE.

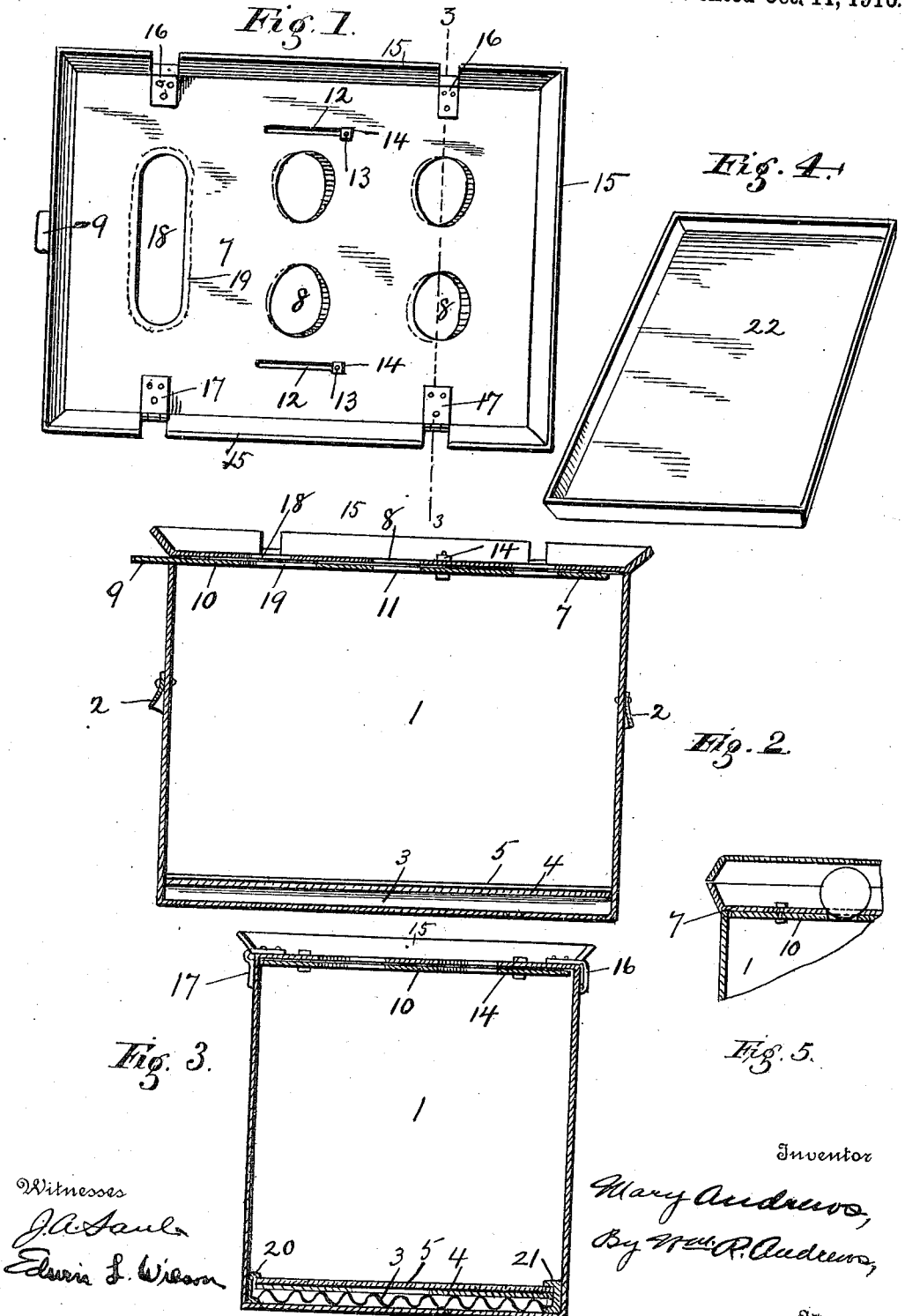

MARY ANDREWS, OF STRATTON, NEBRASKA.

EGG-TESTER.

972,592. Specification of Letters Patent. Patented Oct. 11, 1910.

Application filed February 21, 1910. Serial No. 545,111.

*To all whom it may concern:*

Be it known that I, MARY ANDREWS, a citizen of the United States, residing at Stratton, in the county of Hitchcock and State of Nebraska, have invented certain new and useful Improvements in Egg-Testers, of which the following is a specification.

My invention relates to egg-testers, for the purpose of ascertaining the freshness or condition of eggs; and has for its object to so construct the device that a number of eggs may be examined at the same time, and said eggs may then be expeditiously removed from the tester without danger of breakage.

A further object is to provide the device with an adjustable top, so that the egg-receiving orifices may be regulated to receive various sized eggs.

With these and other objects in view, my invention consists of a box having a mirror in its bottom, an apertured top through which the operator may view the eggs, and a tray to handle the same.

In the drawings forming a part of this specification, and in which like symbols of reference represent corresponding parts in the several views:—Figure 1 is a plan view of the device; Fig. 2 is a vertical section of the device; Fig. 3 is a vertical section on the line 3—3 of Fig. 1; Fig. 4 a view of the top or tray; and, Fig. 5 a transverse sectional view showing a portion of the tray with an egg in position.

1 represents the box or body of the device; 2 the handles of the same; 3 a fluted strip at bottom of the device; 4 an annulus or ring resting on the bottom strip; and 5 the looking-glass or mirror to reflect the eggs.

7 is the top of the device, formed with openings 8 for reception of the eggs; 9 a thumbpiece for operating the slide 10; and 11 egg-receiving openings in the slide.

12 are slots formed in the cover within which pins 13 are adapted to slide, said pins having nuts 14 to hold the top and slide in their relation to each other.

15 is a flange or rim on the cover for the purpose of preventing the eggs rolling off the same; 16 hinges; and 17 latches for fastening the same.

18 is the sight-opening in the top, and 19 a corresponding sight-opening in the slide, said slide-opening being of larger diameter than the top opening to permit said slide to operate without interfering with the sight-opening.

20 and 21 are holders for the mirror and its base-pieces, one of said strips being fastened in the box and the other preferably loose, so that the mirror and its strips may be raised out of the box, when desired.

22 is the tray.

The operation of the device will be apparent from the above description. The slide is adjusted to suit the size of the eggs being tested, the tray is placed over the same after the testing, when the box may be turned over and the eggs received on the tray, thus greatly facilitating the operation.

The device is preferably made of tin, the same being more durable and easily constructed.

Having now fully described my invention, what I claim as new, and desire to secure by Letters-Patent, is:—

1. An egg-tester, comprising a top formed with egg-receiving holes and slots, and a slide adapted to work in conjunction with the top and also formed with corresponding egg-receiving holes and having guide-pins to operate in the slots of the top, so that the same may be adjusted to adapt it to different sized eggs.

2. An egg-tester, comprising a top formed with egg-receiving holes, a slide adapted to work in conjunction with the top and having holes registering with the holes in the top, means to guide and hold the slide and top in proper relation, and a mirror in the bottom of the tester.

3. An egg-tester, comprising a top formed with egg-receiving holes and a sight-opening, a slide adapted to work in conjunction with the top and having corresponding holes and a sight-opening of larger diameter than the top opening, and means for holding and permitting the slides to operate with relation to each other.

4. An egg-tester, comprising a top formed with egg-receiving holes and a sight-opening, a slide adapted to work in conjunction with the top and having openings corresponding to the top of the device, a mirror in the bottom of the tester, gutter-like strips to receive and hold the mirror, and a tray adapted to be received on top of the tester.

In testimony whereof I affix my signature in presence of two witnesses.

MARY ANDREWS.

Witnesses:
J. W. SMITH,
A. F. STRAYER.